United States Patent
Huebner

[15] 3,689,676
[45] Sept. 5, 1972

[54] BICYCLOALKANES IN TREATING DEPRESSION

[72] Inventor: Charles Ferdinarnd Huebner, Chatham, N.J. 07928

[73] Assignee: Ciba Geigy Corporation, Ardsley, N.Y.

[22] Filed: April 2, 1969

[21] Appl. No.: 812,865

[52] U.S. Cl. ............424/330, 260/570.8, 260/570.9
[51] Int. Cl. ...............................................A61k 27/00
[58] Field of Search..........260/570.8 TC, 239, 567.6, 570.9;424/330

[56] References Cited
OTHER PUBLICATIONS
Chem. Abst. 70– 11411 f

*Primary Examiner*—Stanley J. Friedman
*Attorney*—Harry Goldsmith, Joseph G. Kolodny, Bryant W. Brennan and Edward J. Sites

[57] ABSTRACT

1-Aminoalkyl-dibenzobicycloalkanes, e.g., those of the formula

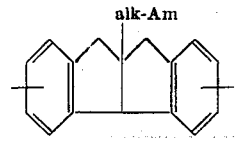

Am = an alkylated amino group
alk = alkylene
and salts thereof are antidepressants.

2 Claims, No Drawings

BICYCLOALKANES IN TREATING DEPRESSION

SUMMARY OF THE INVENTION

The present invention concerns and has for its object the provision of new 1-aminoalkyl-dibenzobicycloalkanes, preferably of those having Formula I

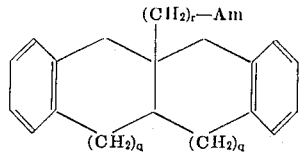

(I)

in which Am is mono- or di-lower alkylamino, $q$ is the integer 0 or 1 and $r$ is the integer 1 or 2, and salts thereof, as well as of corresponding pharmaceutical compositions and of methods for the preparation and application of these products. Said compositions are useful antidepressants, for example, in the treatment or management of exo- or endogeneous depressions.

DESCRIPTION OF THE PREFERRED EMBODIMENT

The amino group Am is mono- or di-lower alkylamino, e.g., methylamino, ethylamino, i-propylamino, dimethylamino, N-methyl-N-ethylamino, diethylamino, di-n- or i-propylamino or di-n-butylamino.

The compounds of the invention exhibit valuable pharmacological properties, for example, imipramine-type antidepressant effects. This can be demonstrated in animal tests, using advantageously mammals, such as mice or rats, as test objects. The compounds of the invention can be applied to the animals orally, subcutaneously or intraperitoneally, e.g., in the form of aqueous solutions or suspensions. The dosage may range between about 1 and 150 mg/kg/day, preferably between about 5 and 50 mg/kg/day, advantageously between about 10 and 25 mg/kg/day. A depressant effect can be observed in the mice jiggle test system, at oral doses between about 30 and 150 mg/kg, where the spontaneous movements of the animals are recorded. An antidepressant activity can be observed in mice, for example, via the reversal of reserpine hypothermia at oral doses of about 15–25 mg/kg, or via the potentiation of amphetamine in rats at intraperitoneal doses of about 5–25 mg/kg. Said tests can be performed, for example, according to Pletscher Ann. N.Y. Acad. Sci. 80, 1039 (1959), Maxwell et al, Nature 191, 84 (1961) or Carlton, Psychopharmacologia 1961, Vol II, 364. Accordingly, the compounds of the invention are useful antidepressants, but also useful as intermediates in the preparation of other valuable products, especially of pharmacologically active compounds.

Especially valuable are the compounds of Formula I, in which Am is methylamino or dimethylamino, $q$ is the integer 0 and $r$ is the integer 1 or 2, and therapeutically acceptable acid addition salts thereof.

The compounds of this invention are prepared according to methods known per se. For example, they are obtained by:
a. converting in a compound of the formula

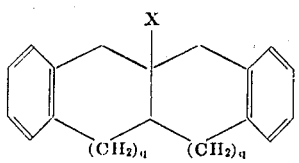

in which X is a substituent capable of being converted into $(CH_2)_r$-Am. X into said aminoalkyl group and, if desired, converting any resulting compound into another compound of the invention.

The substituent X is, for example, a reactively esterified hydroxyalkyl group, for example, such derived from a strong mineral acid, particularly a hydrohalic acid, e.g., hydrochloric or hydrobromic acid, a sulfuric or sulfonic acid, such as a lower alkane or benzene sulfonic acid, e.g., methane, ethane or p-toluene sulfonic acid, or a phosphoniumalkyl group, e.g., a triphenyl-phosphoniumalkyl halide group. Said groups are converted into aminoalkyl by condensation with H-Am, or an alkali metal, e.g., sodium salt thereof.

Another substituent X is, for example, a (nitro, oximino, imino, cyano, carbamoyl, isocyanato or esterified carboxyamino, e.g., carbalkoxyamino)-alkyl, -alkenyl, -alkanoyl or -hydroxyalkyl group, an aminoalkenyl, -alkanoyl or -hydroxyalkyl group, cyano or preferably carbamoyl, e.g., COAm, which radicals can be converted into aminoalkyl by reduction and/or hydrolysis. The above nitro compounds, nitriles, amides, isocyanates, urethanes or alkanoyl compounds are advantageously reduced with the use of simple or complex light metal hydrides, e.g., boron hydride or alkali metal boron or aluminum hydrides, such as lithium aluminum hydride or sodium boron hydride. In this reduction, the cyano and carbamoyl groups are converted into aminomethyl groups, the isocyanato or esterified carboxyamino groups into methylamino groups and the alkanoyl groups into alkyl or α-hydroxy alkyl groups. Said oximes, Schiff's bases (i.e. iminoalkyl- or aminohydroxyalkyl compounds) or said ω-amino-α-hydroxyalkyl reduction products of the alkanoyl compounds, as well as the nitro compounds and aminoalkenyl compounds, are preferably reduced with nascent hydrogen, such as hydrogen generated electrolytically or by the action of metals on acids or alcohols, e.g., zinc or iron and mineral or alkanoic acids, sodium or aluminum or their amalgams and lower alkanols. Also, catalytic reduction may be applied, i.e., hydrogen in the presence of nickel, palladium or platinum catalysts. Isocyanates and urethanes may also be subjected to hydrolysis, e.g., with the use of aqueous mineral acids or alkalies.

The compounds of the invention so obtained can be converted into each other according to methods known per se. For example, resulting primary, secondary or tertiary amines can be reacted with reactive esters of the corresponding alcohols, with lower alkyleneoxides, e.g., ethyleneoxide, or with aldehydes or ketones and reducing agents, e.g., formic acid or its functional derivatives or nascent hydrogen, in order to obtain secondary or tertiary amines, or quaternaries respectively.

A resulting basic compound can also be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g., a metal hydroxide, ammonia or a hydroxy ion exchange preparation. Therapeutically useful acids are, for example, inorganic acids, e.g., hydrochloric, hydrobromic, sulfuric, phosphoric, nitric or perchloric acid, or organic acids, e.g., carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxy-benzoic, salicylic, aminosalicyclic, embonic, nicotinic, methanesulfonic, ethanesulfonic, hydroxyethanesulfonic, ethylene-sulfonic, halogen benzenesulfonic, toluenesulfonic, naphthalene-sulfonic, sulfanilic and cyclohexylsulfamic acid; methionine, tryptophan, lysine and arginine.

These or other salts, for example, the picrates, can also be used for purification of the resulting free compounds, which are converted into salts, the salts separated and the free compounds liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g., by fractional distillation, crystallization and/or chromatography. Racemic products can likewise be resolved into the optical antipodes, for example by separation of diastereomeric salts thereof, e.g., by the fractional crystallization of d- or l-tartrates.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to those compounds of the invention, which are indicated above as the preferred embodiments of the invention.

The starting material used is known or, if new, may be prepared according to methods known per se. For example, starting material mentioned under item a) can be prepared by reacting an anthracene with the compound R—C ≡ C—X, wherein X preferably is an esterified carboxyl group, for example, according to Vaughn et al., J. Am. Chem. Soc. 74, 5623 (1952). The Diels-Alder adduct obtained can be irradiated analogously to the reactions described in J. Am. Chem. Soc. 88, 2882 (1966) and 90, 4465, preferably with light having a $\lambda > 300$ A and/or in the presence of photosensitizers, preferably ketonic sensitizers, e.g., acetone, acetophenone or benzophenone, to yield corresponding 1-X-dibenzosemibullvalenes. The cyclopropane ring thereof can be opened reductively, e.g., with the use of sodium and ammonia. The compounds obtained can then be converted into the other starting materials as described for the final product of the invention. For example, resulting esters can be hydrolyzed or transesterified in the presence of acidic or alkaline agents, e.g., mineral or complex heavy metal acids or alkali metal carbonates or alcoholates, or treated with H-Am. Resulting acids can be converted into their halides by treatment with thionyl or oxalyl halides or phosphorus halides or oxyhalides. Resulting acid halides may be treated with alcohols, ammonia or amines and resulting metal or ammonium salts with aliphatic or araliphatic halides or chlorosulfites, thionyl halides, phosphorus oxide, halides or oxyhalides or other acyl halides as well as alkali metal cyanides, in order to obtain the corresponding esters, halides, anhydrides, amides or the nitrile respectively. Resulting amides can be hydrolyzed under acidic or alkaline conditions, e.g., with the use of aqueous mineral and/or carboxylic acids or alkali metal hydroxides, also alcoholized or transaminated. Starting material in which X contains more than one carbon atom can be obtained from that in which X is halomethyl according to the Wittig reaction to yield said phosphonium compounds. Readily available compounds in which X is acetyl, can be converted into corresponding amides according to the Willgerodt-Kindler reaction or may be halogenated and aminated in order to yield the compounds in which X is Am-acetyl. Compounds in which X is formyl, can be reacted with nitromethane to yield corresponding 2-nitroethenyl compounds.

The pharmaceutically active compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g., lactose, glucose or sucrose, starches, e.g., corn starch or arrowroot, stearic acid or salts thereof, e.g., magnesium or calcium stearate, talc, vegetable fats or oils, gums, alginic acid, benzyl alcohols, glycols, and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75 percent, more particularly 1 to 50 percent, of the active ingredient. They are also included within the scope of the present invention.

The following examples are intended to illustrate the invention and are not to be construed as being limitations thereon. Temperatures are given in degrees centigrade, and all parts wherever given are parts by weight.

EXAMPLE 1

The solution of 3.8 g 9a-dimethylcarbamoyl-4b,9,9a,10-tetrahydro-indeno[1,2-a]indene in 100 ml tetrahydrofuran is added dropwise to the stirred mixture of 1 g lithium aluminum hydride and 25 ml diethyl ether. The mixture is refluxed for 6 hours, cooled with ice, and 1 ml water, 2 ml 12 percent aqueous sodium hydroxide and 3 ml water are added in this succession. It is filtered, the filtrate evaporated in vacuo, the residue taken up in the minimum amount of ethanol, the solution acidified with ethanolic hydrogen chloride and diluted with diethyl ether, to yield the 9a-dimethylaminomethyl-4b,9,9a,10-tetrahydro-indeno[1,2-a]indene hydrochloride of the formula

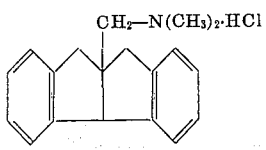

It loses solvent of crystallization at about 170°–180°, resolidifies and finally melts at 230°–235°.

The starting material can be prepared as follows: The mixture of 40 g anthracene, 22 g ethyl propiolate and 150 ml xylene is refluxed for 7 days. After cooling, it is filtered, the residue washed with acetonitrile and the filtrate evaporated in vacuo. The residue is recrystallized from ethanol, to yield the 11-carbethoxy-9,10-ethenoanthracene melting at 108°–110°.

The mixture of 30 g thereof, 100 ml 18 percent aqueous sodium hydroxide and 40 ml methanol is refluxed for 3 hours and evaporated in vacuo. The residue is dissolved in hot water, the solution filtered and the cold filtrate acidified with 15 percent aqueous hydrochloric acid. The precipitate formed is filtered off and recrystallized from acetonitrile, to yield the corresponding free acid melting at 250°.

The solution of 10 g thereof in 250 ml tetrahydrofuran is irradiated by a low-pressure ultraviolet lamp until no starting material can be detected by NMR-analysis. It is evaporated and the residue recrystallized from ethanol, to yield the 1-carboxy-dibenzosemibullvalene melting at 230°–232°.

To the mixture of 2 g thereof and 50 ml methanol, 0.44 g sodium methoxide are added while stirring. It is evaporated in vacuo, the residue finely powdered and added to the fresh mixture of 200 ml liquid ammonia and 0.5 g sodium while stirring. After stirring for 15 minutes, the excess of sodium is converted into sodium amide by the addition of 50 mg ferric nitrate nonahydrate. The mixture is allowed to evaporate, the residue taken up in water, the solution acidified with hydrochloric acid, the precipitate formed filtered off and recyrstallized from ethanol, to yield the 9a-carboxy-4b,9,9a,10-tetrahydro-indeno[1,2-a]indene melting at 192°.

The mixture of 1 g thereof and 5 ml thionyl chloride is allowed to stand at room temperature overnight and evaporated in vacuo. The residue is taken up in 5 ml benzene and the solution combined with 3 ml 4N dimethylamine in ethyl acetate while cooling and stirring. After 30 minutes, the mixture is evaporated in vacuo, the residue triturated with water and recrystallized from methanol, to yield the 9a-dimethylcarbamoyl-4b,9,9a,10-tetrahydro-indeno[1,2a]indene melting at 165°.

EXAMPLE 2

The solution of 3.9 g 9a-methylcarbamoyl-4b,9,9a,10-tetrahydro-indo[1,2-a]indene in 100 ml tetrahydrofuran is added dropwise to the stirred suspension of 1 g lithium aluminum hydride in 30 ml diethyl ether. The mixture is refluxed for 12 hours, cooled and a few drops ethyl acetate, 1 ml water, 2 ml 12 percent aqueous sodium hydroxide and 3 ml water are added in this order. It is filtered, the filtrate evaporated in vacuo, the residue taken up in the minimum amount of ethanol, the solution acidified with ethanolic hydrogen chloride, the precipitate formed filtered off and recrystallized from ethanol-diethyl ether, to yield the 9a-methylaminomethyl-4b,9,9a,10-tetrahydro-indeno[1,2-a]indene hydrochloride of the formula

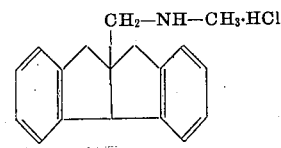

melting at 265°.

The starting material is prepared as follows: The mixture of 5 g 9a-carboxy-4b,9,9a10-tetrahydro-indeno[1,2-a]indene and 50 ml thionyl chloride is allowed to stand at room temperature overnight and evaporated in vacuo. The residue is taken up in the minimum amount of benzene and the solution again evaporated in vacuo. The residue is taken up in 100 ml benzene and methylamine is bubbled through the solution until it stays basic. It is filtered, the filtrate evaporated in vacuo, the residue washed with water and recrystallized from ethanol, to yield the 9a-methylcarbamoyl-4b,9,9a,10-tetrahydro-indeno[1,2-a]indene melting at 156°–158°.

EXAMPLE 3

The mixture of 1 g 9,10-dioxo-9a-dimethylaminomethyl-4b,9,9a,10-tetrahydro-indeno[1,2-a]indene, 10 ml ethanol and 0.1 g 10 percent palladium on charcoal is hydrogenated at 3.4 at until the theoretical amount of hydrogen has been absorbed. It is filtered, the residue washed with hot ethanol, the filtrate concentrated, acidified with ethanolic hydrogen chloride and diluted with diethyl ether, to yield the 9a-dimethylaminomethyl-4b, 9,9a,10-tetrahydro-indeno[1,2-a]indene hydrochloride melting at 232°–234°; it is identical with that obtained according to Example 1.

The starting material is prepared as follows: The mixture of 11.7 g 9,10-dioxo-4b,9,9a,10-tetrahydro-indeno[1,2a]-indene, 11.5 ml 37 percent aqueous formaldehyde, 12 ml 5N ethanolic dimethylamine and 25 ml ethanol is slowly heated and refluxed for 4 hours. It is evaporated, the residue taken up in diethyl ether, the solution extracted with 5 percent aqueous hydrochloric acid and the aqueous layer made basic with ammonia. It is extracted with diethyl ether, the extract washed with water, dried, filtered and evaporated, to yield the 9,10-dioxo-9a-dimethylaminomethyl-4b,9,9a,10-tetrahydro-indeno[1,2-a]indene.

EXAMPLE 4

The mixture of 3 g of the bis-ethylenedithio ketal of 9,10-dioxo-9a-dimethylaminomethyl-4b,9,9a,10-tetrahydro-indeno[1,2-a]indene, 100 ml ethanol and 20 g Raney nickel is refluxed for 24 hours, filtered and the filtrate evaporated in vacuo. The residue is taken up in the minimum amount of ethanol, the solution acidified with ethanolic hydrogen chloride and diluted with diethyl ether, to yield the 9a-dimethylaminomethyl-4b,9,9a,10-tetrahydro-indeno[1,2-a]indene hydrochloride, melting at 230°–235°; it is identical with the product obtained according to Example 1.

The starting material is prepared as follows: The solution of 2.9 g 9,10-dioxo-9a-dimethylaminomethyl-4b,9,9a,10-tetrahydro-indeno[1,2a]indene in 10 ml hot acetic acid is treated with 6 ml ethylenedithio glycol followed by the addition of 5 ml boron trifluoride etherate, and the mixture is allowed to stand for 3 days at room temperature. It is combined with 1.7 ml 6N ethanolic hydrogen chloride, diluted with diethyl ether and the precipitate formed filtered off. It is taken up in water, the solution made basic with ammonia and extracted with diethyl ether. The extract is washed with water, dried and evaporated, to yield the desired bis-ethylenedithio ketal.

EXAMPLE 5

To the mixture of 5 g 9a-bromomethyl-4b,9,9a,10-tetrahydro-indeno[1,2a]indene and 10 ml benzene, 12 ml 0.6 molar ethanolic dimethylamine are added and the mixture heated in a sealed tube to 100° for 12 hours. It is evaporated in vacuo, the residue taken up in ammonia and the mixture extracted with diethyl ether. The extract is shaken with 5 percent aqueous hydrochloric acid, the aqueous layer made basic with ammonia and extracted with diethyl ether. The extract is dried, filtered, evaporated, the residue taken up in ethanol the solution acidified with ethanolic hydrogen chloride and diluted with diethyl ether, to yield the 9a-dimethylaminomethyl-4b,9,9a,10-tetrahydro-indeno[1,2-a]indene hydrochloride melting at 230°–235°; it is identical with the product obtained according to Example 1.

The starting material is prepared as follows: The mixture of 11.7 g 9,10-dioxo-4b,9,9a,10-tetrahydro-indeno[1,2-a]indene, 1.6 g paraformaldehyde, 0.3 g potassium carbonate and 100 ml methanol is stirred for 24 hours at room temperature. It is diluted with water, the precipitate formed filtered off and dissolved in 100 ml ethanol. The solution is hydrogenated over 2 g 10 percent palladium on charcoal at 3.4 at until 4 mol equivalents of hydrogen have been consumed. It is filtered, the residue washed with hot ethanol and the filtrate evaporated, to yield the 9a-hydroxymethyl-4b,9,9a,10-tetrahydro-indeno[1,2-a]indene.

To the solution of 5 g thereof in 100 ml anhydrous diethyl ether, 0.67 ml phosphorus tribromide are slowly added while stirring and cooling in a dry ice-ethanol bath. The mixture is allowed to warm up to room temperature overnight, poured onto ice and the mixture stirred for 1 hour. The organic solution is separated, washed with water and aqueous sodium bicarbonate, dried, filtered and evaporated in vacuo, to yield the 9a-bromomethyl-4b,9,9a,10-tetrahydro-indeno[1,2-a]indene, which is used as such without further purification.

EXAMPLE 6

Preparation of 10,000 tablets each containing 10.0 mg of the active ingredient:

| Formula | |
|---|---|
| 9a-dimethy aminomethyl-4b,9,9a,0-tetrahydro-indeno[1,2-a]indene | 100.00 g |
| Lactose | 1,157.00 g |
| Corn starch | 75.00 g |
| Polyethylene glycol 6,000 | 75.00 g |
| Talcum powder | 75.00 g |
| Magnesium stearate | 18.00 g |
| Purified water | q.s. |

Procedure

All the powders are passed through a screen with openings of 0.6 mm. Then the drug substance, lactose, talcum magnesium stearate and half of the starch are mixed in a suitable mixer. The other half of the starch is suspended in 40 ml water and the suspension added to the boiling solution of the polyethylene glycol in 150 ml water. The paste formed is added to the powders which are granulated, if necessary, with an additional amount of water. The granulate is dried overnight at 35°, broken on a screen with 1.2 mm openings and compressed into tablets using concave punches with 6.4 mm diameter, uppers bisected.

I claim:

1. A pharmaceutical composition comprising an antidepressively effective amount of a compound of the formula

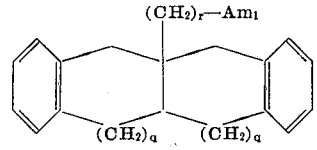

in which $Am_1$ is mono- or di-lower alkylamino, $q$ is the integer 0 or 1 and $r$ is the integer 1 or 2, or a therapeutically acceptable acid addition salt thereof, together with a pharmaceutical excipient.

2. A pharmaceutical composition as claimed in claim 1, wherein the antidepressively effective compound is the 9a-methylaminomethyl-4b,9,9a,10-tetrahydro-indeno[1,2-a]indene or a therapeutically acceptable acid addition salt thereof.

* * * * *